United States Patent
Chakiris et al.

(10) Patent No.: US 10,728,398 B2
(45) Date of Patent: *Jul. 28, 2020

(54) INSERTING VALUE INTO CUSTOMER ACCOUNT AT POINT OF SALE USING A CUSTOMER ACCOUNT IDENTIFIER

(71) Applicants: Phil M Chakiris, Atlanta, GA (US); Merrill Brooks Smith, Ft. Lauderdale, FL (US); Phillip Craig Graves, Atlanta, GA (US)

(72) Inventors: Phil M Chakiris, Atlanta, GA (US); Merrill Brooks Smith, Ft. Lauderdale, FL (US); Phillip Craig Graves, Atlanta, GA (US)

(73) Assignee: E2INTERACTIVE, INC., Atlanta, GA (US)

( * ) Notice: Subject to any disclaimer, the term of this patent is extended or adjusted under 35 U.S.C. 154(b) by 86 days.

This patent is subject to a terminal disclaimer.

(21) Appl. No.: 16/101,977

(22) Filed: Aug. 13, 2018

(65) Prior Publication Data

US 2019/0007561 A1 Jan. 3, 2019

Related U.S. Application Data

(63) Continuation of application No. 12/955,543, filed on Nov. 29, 2010, now Pat. No. 10,063,714, which is a
(Continued)

(51) Int. Cl.
*G06Q 40/00* (2012.01)
*H04M 17/02* (2006.01)
(Continued)

(52) U.S. Cl.
CPC ............ *H04M 17/02* (2013.01); *G06Q 20/10* (2013.01); *G06Q 20/202* (2013.01);
(Continued)

(58) Field of Classification Search
CPC ..... G06Q 20/105; G06Q 20/18; G06Q 20/202
See application file for complete search history.

(56) References Cited

U.S. PATENT DOCUMENTS 3,288,350 A 11/1966 Kushner
5,091,634 A 2/1992 Finch et al.
(Continued)

FOREIGN PATENT DOCUMENTS

CN 102609839 A 7/2012
EP 2128809 A1 12/2009
(Continued)

*Primary Examiner* — Scott S Trotter
(74) *Attorney, Agent, or Firm* — Landmark Intellectual Property Law, PLLC; Gregory Murphy

(57) ABSTRACT

A method of adding a value to a customer account is provided. A request to add a value to a customer account of a customer is received from a point of sale terminal. The request may comprise value identification data associated with the value and account identification data associated with the customer account. The customer account identification data may be entered at the point of sale. The request may be associated with a purchase of the value. The value may be caused to be added to the customer account. During subsequent value purchase transactions, additional value may be added to the account.

21 Claims, 10 Drawing Sheets

Related U.S. Application Data continuation of application No. 12/607,141, filed on Oct. 28, 2009, now Pat. No. 8,244,612, which is a continuation of application No. 11/290,606, filed on Dec. 1, 2005, now Pat. No. 7,630,926, which is a continuation-in-part of application No. 10/739,307, filed on Dec. 19, 2003, now Pat. No. 7,328,190.

(60) Provisional application No. 60/519,629, filed on Nov. 14, 2003, provisional application No. 60/519,630, filed on Nov. 14, 2003.

(51) Int. Cl.
| | |
|---|---|
| *G06Q 20/10* | (2012.01) |
| *G06Q 20/20* | (2012.01) |
| *G06Q 20/40* | (2012.01) |
| *G06Q 30/02* | (2012.01) |
| *G06Q 40/04* | (2012.01) |
| *H04M 15/00* | (2006.01) |
| *H04M 17/00* | (2006.01) |

(52) U.S. Cl.
CPC .......... *G06Q 20/204* (2013.01); *G06Q 20/40* (2013.01); *G06Q 30/02* (2013.01); *G06Q 40/00* (2013.01); *G06Q 40/04* (2013.01); *H04M 15/00* (2013.01); *H04M 15/48* (2013.01); *H04M 15/49* (2013.01); *H04M 15/68* (2013.01); *H04M 15/8083* (2013.01); *H04M 17/00* (2013.01); *H04M 17/10* (2013.01); *H04M 17/20* (2013.01); *H04M 2017/25* (2013.01); *H04M 2017/2506* (2013.01); *H04M 2017/2512* (2013.01); *H04M 2017/2518* (2013.01); *H04M 2017/2537* (2013.01); *H04M 2017/2556* (2013.01); *H04M 2017/2562* (2013.01); *H04M 2017/2593* (2013.01); *H04M 2215/0156* (2013.01); *H04M 2215/0184* (2013.01); *H04M 2215/0192* (2013.01); *H04M 2215/0196* (2013.01); *H04M 2215/46* (2013.01)

(56) References Cited

U.S. PATENT DOCUMENTS

| | | | |
|---|---|---|---|
| 5,602,377 A | 2/1997 | Beller et al. | |
| 5,708,780 A | 1/1998 | Levergood | |
| 5,729,693 A | 3/1998 | Holda-Fleck | |
| 5,740,915 A | 4/1998 | Williams | |
| 5,897,625 A | 4/1999 | Gustin | |
| 5,903,633 A | 5/1999 | Lorsch | |
| 6,085,242 A | 7/2000 | Chandra | |
| 6,304,860 B1 | 10/2001 | Martin | |
| 6,315,193 B1 | 11/2001 | Hogan | |
| 6,317,028 B1 | 11/2001 | Valiulis | |
| 6,360,254 B1 | 3/2002 | Linden | |
| 6,418,414 B1 | 7/2002 | Lutz et al. | |
| 6,418,441 B1 | 7/2002 | Call | |
| 6,422,462 B1 | 7/2002 | Cohen | |
| 6,424,706 B1 | 7/2002 | Katz et al. | |
| 6,442,532 B1 | 8/2002 | Kawan | |
| 6,473,739 B1 | 10/2002 | Showghi et al. | |
| 6,507,823 B1 | 1/2003 | Nel | |
| 6,529,956 B1 | 3/2003 | Smith | |
| 6,536,659 B1 | 3/2003 | Hauser | |
| 6,648,222 B2 | 11/2003 | McDonald et al. | |
| 6,829,596 B1 | 12/2004 | Frazee | |
| 6,915,277 B1 | 7/2005 | Manchester et al. | |
| 6,965,866 B2 | 11/2005 | Klein | |
| 7,108,183 B1 | 9/2006 | Cox, Jr. | |
| 7,216,092 B1 | 5/2007 | Weber | |
| 7,434,729 B2 | 10/2008 | Cracchiolo et al. | |
| 7,494,417 B2 | 2/2009 | Walker | |
| 7,513,422 B1 | 4/2009 | Tucker | |
| 7,631,803 B2 | 12/2009 | Peyret et al. | |
| 7,702,542 B2 | 4/2010 | Aslanian | |
| 7,711,598 B2 | 5/2010 | Perkowski | |
| 7,757,944 B2 | 7/2010 | Cline et al. | |
| 7,848,948 B2 | 12/2010 | Perkowski et al. | |
| 7,904,333 B1 | 3/2011 | Perkowski | |
| 7,905,399 B2 | 3/2011 | Barnes et al. | |
| 8,095,463 B1 * | 1/2012 | Hartmaier ............... G06Q 20/04 235/375 |
| 8,103,520 B2 | 1/2012 | Mueller | |
| 8,181,867 B1 | 5/2012 | Bierbaum et al. | |
| 8,265,950 B2 | 9/2012 | Howe et al. | |
| 8,509,814 B1 | 8/2013 | Parker | |
| 8,577,735 B2 | 11/2013 | Wilen | |
| 8,636,203 B1 | 1/2014 | Patterson | |
| 8,751,298 B1 | 6/2014 | Giordano et al. | |
| 8,768,834 B2 | 7/2014 | Zacarias et al. | |
| 9,098,190 B2 | 8/2015 | Zhou | |
| 9,483,786 B2 | 11/2016 | Glass | |
| 9,672,687 B2 | 6/2017 | Cage | |
| 2001/0034609 A1 | 10/2001 | Dovolis | |
| 2001/0037264 A1 | 11/2001 | Husemann et al. | |
| 2001/0056410 A1 | 12/2001 | Ishigaki | |
| 2002/0010627 A1 | 1/2002 | Lerat | |
| 2002/0062249 A1 | 5/2002 | Iannacci | |
| 2002/0065713 A1 | 5/2002 | Awada et al. | |
| 2002/0070270 A1 | 6/2002 | Narita et al. | |
| 2002/0088855 A1 | 7/2002 | Hodes | |
| 2002/0091573 A1 | 7/2002 | Hodes | |
| 2002/0130176 A1 | 9/2002 | Suzuki | |
| 2002/0138573 A1 | 9/2002 | Saguy | |
| 2002/0153410 A1 | 10/2002 | Santini | |
| 2002/0198831 A1 | 12/2002 | Patricelli et al. | |
| 2003/0004802 A1 | 1/2003 | Callegari | |
| 2003/0009382 A1 | 1/2003 | D'Arbeloff | |
| 2003/0105688 A1 | 6/2003 | Brown et al. | |
| 2003/0121967 A1 | 7/2003 | Goldberg et al. | |
| 2003/0163787 A1 | 8/2003 | Hay et al. | |
| 2003/0197059 A1 | 10/2003 | Tidball et al. | |
| 2003/0234819 A1 | 12/2003 | Daly et al. | |
| 2004/0065726 A1 | 4/2004 | McGee et al. | |
| 2004/0117302 A1 | 6/2004 | Weichert et al. | |
| 2004/0185881 A1 | 9/2004 | Lee | |
| 2004/0193490 A1 | 9/2004 | Pletz | |
| 2004/0225560 A1 | 11/2004 | Lewis et al. | |
| 2004/0267663 A1 | 12/2004 | Karns | |
| 2005/0027624 A1 | 2/2005 | Cai | |
| 2005/0045732 A1 | 3/2005 | Whitaker | |
| 2005/0086168 A1 | 4/2005 | Alvarez | |
| 2005/0116028 A1 | 6/2005 | Cotten | |
| 2005/0182695 A1 | 8/2005 | Lubow et al. | |
| 2005/0261968 A1 | 11/2005 | Randall et al. | |
| 2006/0004631 A1 | 1/2006 | Roberts et al. | |
| 2006/0037835 A1 | 2/2006 | Doran | |
| 2006/0041470 A1 | 2/2006 | Filho et al. | |
| 2006/0053056 A1 | 3/2006 | Alspach-Goss et al. | |
| 2006/0089160 A1 | 4/2006 | Othmer | |
| 2006/0113376 A1 | 6/2006 | Reed et al. | |
| 2006/0253320 A1 | 11/2006 | Heywood | |
| 2007/0017975 A1 | 1/2007 | Lewis et al. | |
| 2007/0021969 A1 | 1/2007 | Homeier-Beals | |
| 2007/0030824 A1 | 2/2007 | Ribaudo | |
| 2007/0038577 A1 | 2/2007 | Werner | |
| 2007/0043682 A1 | 2/2007 | Drapkin et al. | |
| 2007/0055785 A1 | 3/2007 | Stevens | |
| 2007/0156436 A1 | 4/2007 | Fisher | |
| 2007/0125838 A1 | 6/2007 | Law et al. | |
| 2007/0136149 A1 | 6/2007 | Woodward et al. | |
| 2007/0162338 A1 | 7/2007 | Lawe | |
| 2007/0192182 A1 | 8/2007 | Monaco et al. | |
| 2007/0198433 A1 | 8/2007 | McGee et al. | |
| 2007/0251995 A1 | 11/2007 | Kingsborough et al. | |
| 2007/0265872 A1 | 11/2007 | Robinson et al. | |
| 2008/0028395 A1 | 1/2008 | Motta et al. | |
| 2008/0052169 A1 | 2/2008 | O'Shea et al. | |
| 2008/0059318 A1 | 3/2008 | Packes et al. | |
| 2008/0078831 A1 | 4/2008 | Johnson et al. | |
| 2008/0097851 A1 | 4/2008 | Bemmel et al. | |

(56) References Cited

U.S. PATENT DOCUMENTS

| | | |
|---|---|---|
| 2008/0133351 A1 | 6/2008 | White et al. |
| 2008/0179395 A1 | 7/2008 | Dixon et al. |
| 2008/0255942 A1 | 10/2008 | Craft |
| 2008/0319868 A1 | 12/2008 | Briscoe |
| 2009/0037326 A1 | 2/2009 | Chitti et al. |
| 2009/0076896 A1 | 3/2009 | Dewitt |
| 2009/0078755 A1 | 3/2009 | Sullivan et al. |
| 2009/0094126 A1 | 4/2009 | Killian et al. |
| 2009/0111378 A1 | 4/2009 | Sheynman |
| 2009/0112709 A1 | 4/2009 | Barhydt et al. |
| 2009/0144161 A1 | 6/2009 | Fisher |
| 2009/0157487 A1 | 6/2009 | Cottrell et al. |
| 2009/0164329 A1 | 6/2009 | Bishop et al. |
| 2009/0171739 A1 | 7/2009 | De et al. |
| 2009/0187491 A1 | 7/2009 | Bull |
| 2009/0192904 A1 | 7/2009 | Patterson et al. |
| 2009/0192928 A1 | 7/2009 | Abifaker |
| 2009/0247131 A1 | 10/2009 | Champion |
| 2009/0281941 A1 | 11/2009 | Worth |
| 2009/0287558 A1 | 11/2009 | Seth et al. |
| 2009/0298427 A1 | 12/2009 | Wilkinson |
| 2010/0010906 A1 | 1/2010 | Grecia |
| 2010/0041368 A1 | 2/2010 | Kumar |
| 2010/0082490 A1 | 4/2010 | Rosenblatt |
| 2010/0088188 A1 | 4/2010 | Kumar et al. |
| 2010/0131415 A1 | 5/2010 | Sartipi |
| 2010/0185461 A1 | 7/2010 | Broeska et al. |
| 2010/0205063 A1 | 8/2010 | Mersky |
| 2010/0293536 A1 | 11/2010 | Nikitin |
| 2010/0299194 A1 | 11/2010 | Snyder et al. |
| 2010/0304852 A1 | 12/2010 | Szrek |
| 2011/0035268 A1 | 2/2011 | Rossi |
| 2011/0040684 A1 | 2/2011 | Beck et al. |
| 2011/0106698 A1 | 5/2011 | Isaacson |
| 2011/0161226 A1 | 6/2011 | Courtion |
| 2011/0202419 A1 | 8/2011 | Mamdani |
| 2011/0234514 A1 | 9/2011 | Gothard |
| 2011/0246284 A1 | 10/2011 | Chaikin |
| 2012/0136780 A1 | 5/2012 | El-Awady |
| 2012/0209688 A1 | 8/2012 | Lamothe et al. |
| 2013/0073388 A1 | 3/2013 | Heath |
| 2013/0179177 A1 | 7/2013 | Dhavle et al. |
| 2013/0290121 A1 | 10/2013 | Simakov |
| 2013/0304561 A1 | 11/2013 | Warner et al. |
| 2014/0006268 A1 | 1/2014 | Roberts |
| 2014/0019238 A1 | 1/2014 | Blatchley |
| 2015/0278845 A1 | 10/2015 | Sorem et al. |
| 2017/0076293 A1 | 3/2017 | Cage |

FOREIGN PATENT DOCUMENTS

| | | |
|---|---|---|
| JP | 2002189963 A | 7/2002 |
| JP | 2003208541 A | 7/2003 |
| JP | 2008541303 A | 11/2008 |
| JP | 2010521017 A | 6/2010 |
| KR | 20020027427 A | 4/2002 |
| WO | 2013078499 A1 | 6/2013 |

* cited by examiner

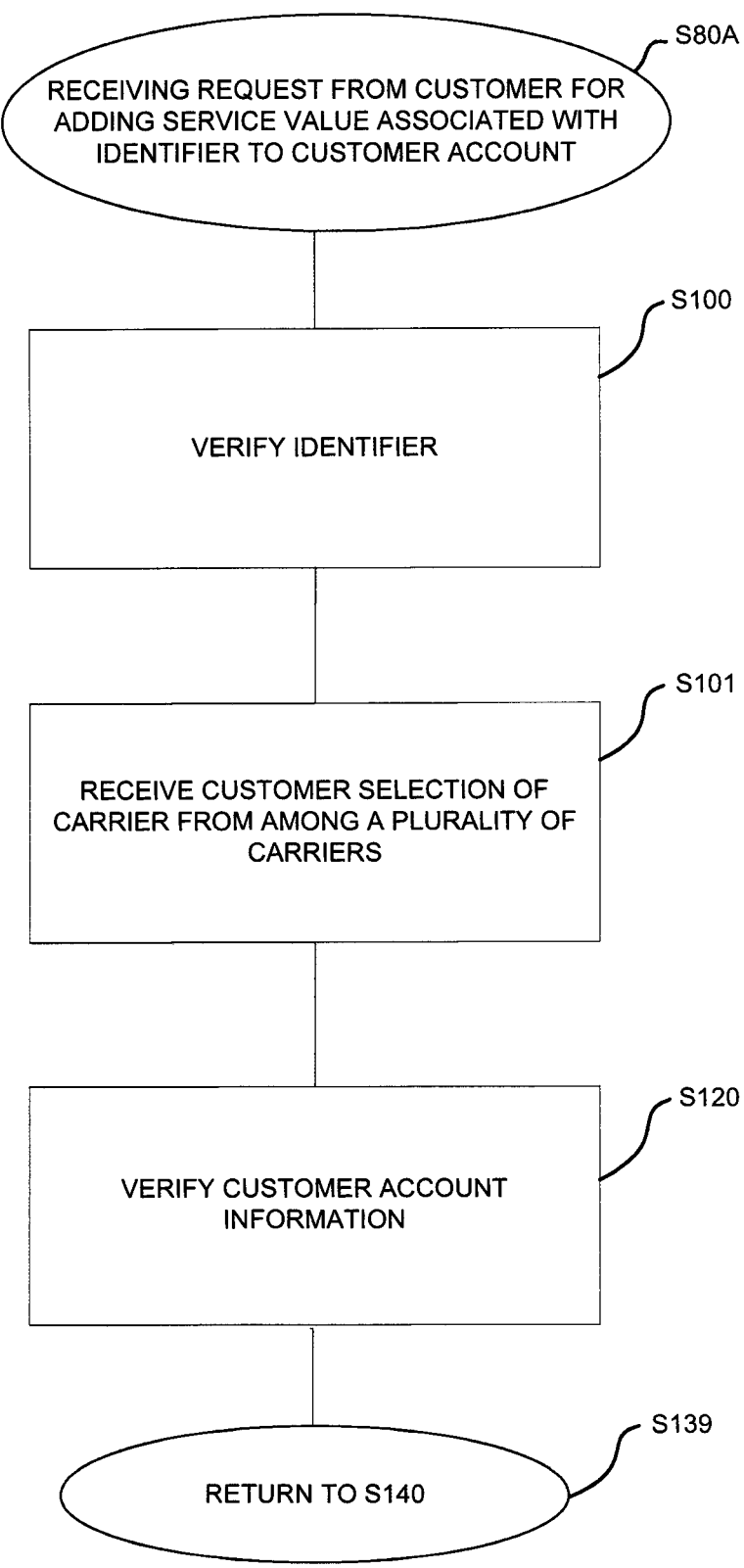

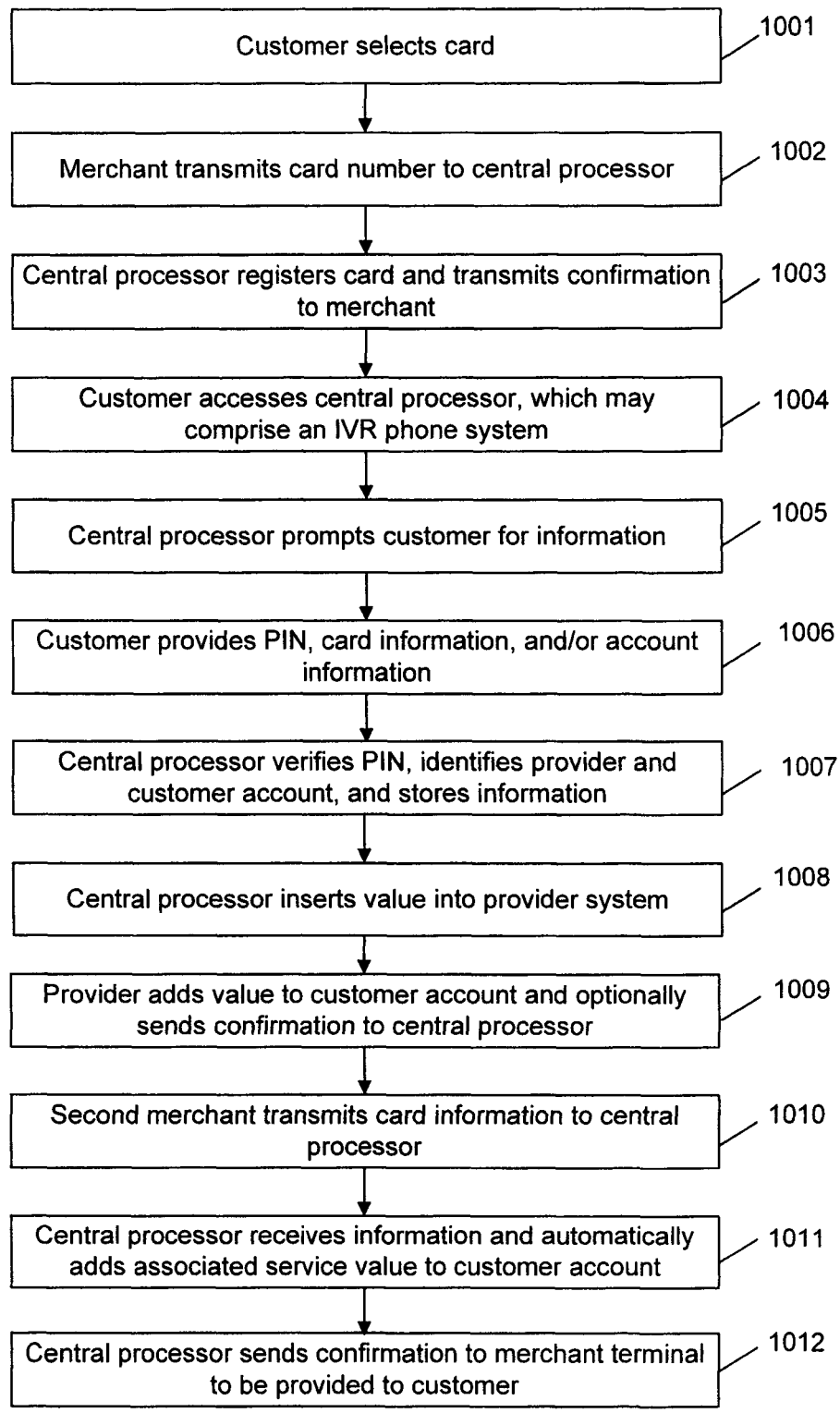

INSERTING VALUE INTO CUSTOMER ACCOUNT AT POINT OF SALE USING A CUSTOMER ACCOUNT IDENTIFIER

CROSS-REFERENCE TO RELATED APPLICATIONS

This application is a continuation of U.S. Non-Provisional patent application Ser. No. 12/955,543, filed on Nov. 29, 2010, which is a continuation of U.S. patent application Ser. No. 12/607,141, now U.S. Pat. No. 8,244,612, filed on Oct. 28, 2009, which is a continuation of U.S. patent application Ser. No. 11/290,606, now U.S. Pat. No. 7,630,926, filed on Dec. 1, 2005, which is a continuation-in-part of U.S. application Ser. No. 10/739,301, now U.S. Pat. No. 7,328,190 filed Dec. 19, 2003, which claims priority to U.S. Provisional Application No. 60/519,630 filed on Nov. 14, 2003, and U.S. Provisional Application 60/519,629 filed on Nov. 14, 2003.

This application also claims priority to U.S. application Ser. No. 10/712,182 filed Nov. 18, 2003, U.S. application Ser. No. 10/655,858 filed Sep. 5, 2003, U.S. patent application Ser. No. 10/698,084 filed Nov. 3, 2003, and U.S. application Ser. No. 10/253,243 filed Sep. 24, 2002, which claims priority to U.S. Provisional Application No. 60/324,333 filed Sep. 24, 2001 and U.S. Provisional Application No. 60/396,404 filed Jul. 15, 2002.

This application also claims priority to U.S. application Ser. No. 10/411,971, filed Apr. 11, 2003, which claims priority to U.S. application Ser. No. 09/641,363 filed Aug. 18, 2000, now issued U.S. Pat. No. 6,575,361, which claims priority to U.S. Provisional Application No. 60/149,740 filed Aug. 19, 1999.

This application also claims priority to U.S. application Ser. No. 10/732,641 filed Dec. 10, 2003.

This application is related to International Application No. PCT/US02/30281 filed Sep. 24, 2002.

All of the aforementioned applications are incorporated herein by reference in their entireties.

FIELD OF THE INVENTION

This invention relates to stored-value card accounts. More particularly, the invention relates to adding stored value to a stored-value account as a result of a point-of-sale transaction. The stored value account may be managed by a third party. As described in the related applications, the data of the stored-value cards is related to services and/or products paid or prepaid by the owner or end user of the card. Each of the stored-value cards may be associated with a PIN.

BACKGROUND OF THE INVENTION

Conventional stored value accounts are reloaded in a two-step process. First, the customer purchases a stored value card associated with a specific value, such as $20. Second, the customer accesses a central processor, e.g., by calling an 800 number on the back of the card, and requests to add the card's value to the customer's account. During the call, the customer typically provides card account information as well as information sufficient to identify the customer's account. For a mobile telephone service account, such identifying information may include the identify of the telecommunications service provider (such as AT&T) as well as the customer's mobile phone number.

This two-step process is time-consuming for the customer. In particular, contacting a central processor such as an IVR and navigating through all the prompts to provide all the necessary information can be especially time-consuming and/or difficult, especially for customers who do not speak the languages of the IVR system. For pay-as-you-go accounts, the burdensome IVR system may be navigated anew each time the customer adds value to the account. It is desirable to provide an improved system and method for iteratively adding value to a stored-value account.

SUMMARY OF THE INVENTION

A method of adding a value to a customer account is provided. A request to add a value to a customer account of a customer is received from a point of sale terminal. The request may comprise value identification data associated with the value and account identification data associated with the customer account. The customer account identification data may be entered at the point of sale. The request may be associated with a purchase of the value. The value may be caused to be added to the customer account. During subsequent value purchase transactions, additional value may be added to the account.

[Insert other independent claims in summary form here.]

DESCRIPTION OF THE DRAWINGS

The present invention can be more fully understood by reading the following detailed description together with the accompanying drawings, in which like reference indicators are used to designate like elements, and in which:

FIG. 9 is a flowchart showing the "receiving request from customer for adding service value associated with identifier to customer account" step of FIG. 8 in further detail in accordance with one embodiment of the invention;

FIG. 10 is a flowchart showing a method of recharging an account according to an embodiment of the invention.

Figure 1:
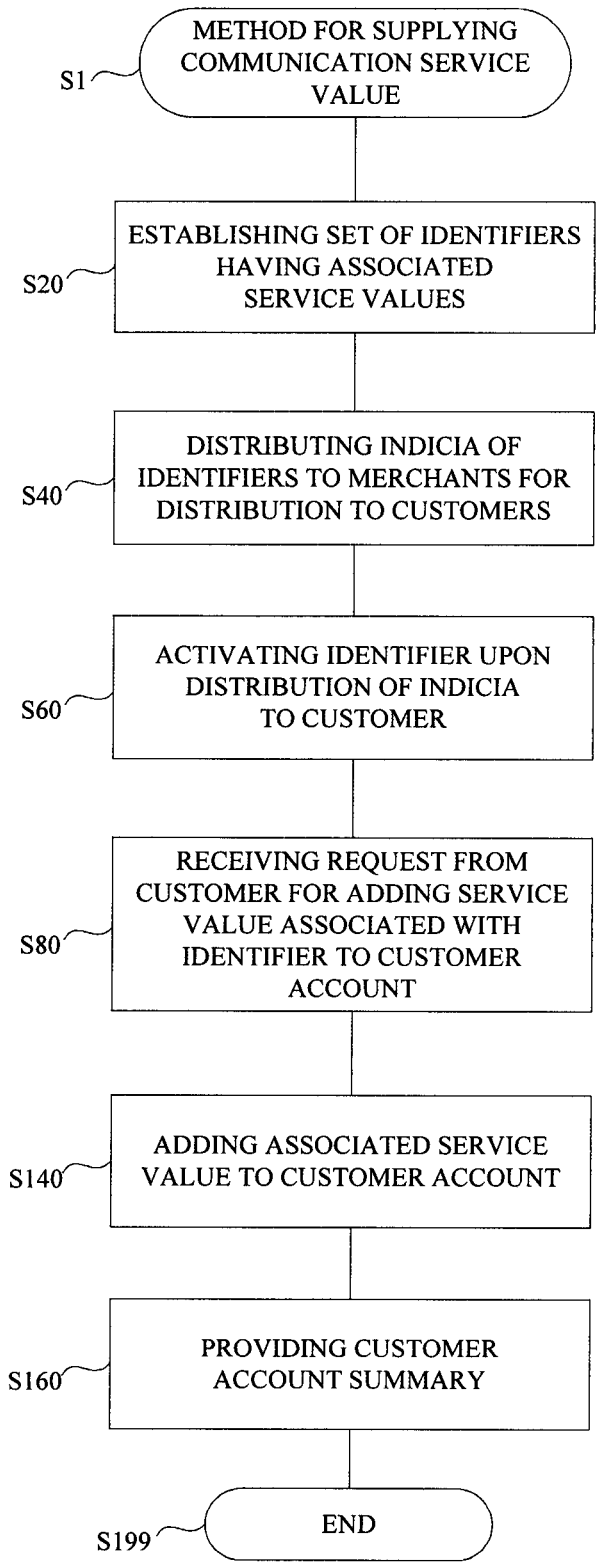
FIG. 1 is a flowchart showing a method for supplying communication service value in accordance with one embodiment of the invention.

Before any embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE DRAWINGS

Many wireless telephone users and other recipients of goods and/or services utilize prepaid account arrangements that require payment before services will be provided. (It should be understood that prepaid wireless telephone service providers are used herein for exemplary purposes only. The invention relates to any customer account, such as an account provided by a provider of one or more goods or services (such as telecommunications service). Examples of prepaid services that may be accommodated by accounts include long distance telephone communication, wireless communication, paging and internet-enabled communication services, etc. For instance, prepaid telecommunications customers may pay as they go with the telecommunications carrier deducting payment for the services directly from the customer's account.

The invention, through a combination of technologies, provides a customer-friendly process that allows the customer to add value, i.e., money or usage credits, to an existing customer account from a point-of-sale (POS) device. The customer may purchase value at a merchant POS terminal or other terminal (such as an ATM). For instance, as in prior art methods, the customer may purchase a stored value card or a PIN associated with value, such as a $20 phone card. Alternatively, a customer may simply request to have a particular value added to a specific account. (It should be noted that the account may belong to the customer or another entity.) In either case, value purchase data and/or customer account identification data (such as phone number corresponding to a telecommunications account) may be provided, e.g., by entering it at the point of sale (e.g., a POS terminal). The value purchase data and customer account identification data may be passed from the POS terminal to a central processor. The central processor may identify the value and/or the customer account based on the received value purchase data and the customer account identification data. For instance, the central processor may identify the value based on a database that links the value identification data (e.g., a value identifier or card number) to a specific value. The central processor may then cause the identified value to be added to (or "inserted" into) the identified account. For instance, the central processor may send an automated and/or electronic request (e.g., via an API) to an account provider system to add the value to the identified customer account.

An advantage of this approach is that value may be added to a customer account via a single POS transaction. This saves time and hassle compared to prior systems, which typically required a POS transaction that activates the value followed by a subsequent phone call and IVR navigation to cause the account provider system to have the activated value added to a specific customer account.

In one aspect of the invention, a central system manages the process that allows the customer to add service value to the customer's account. The central system may maintain a set of identifiers, or Personal Identification Numbers ("PINs"), with each identifier having an associated service value, which preferably represents a monetary figure (i.e., number of dollars, $10, $25 or $50, for example), or some unit of service usage (i.e., minutes). Indicia associated with the identifiers are distributed to merchants for further distribution to customers. In one example, the indicia may be distributed on magnetic stripe cards having predetermined values, such as $10, $25 and $50 cards. It should be appreciated that each indicia, or article bearing indicia, is associated with only one identifier maintained at the central system. Thus, each card distributed is linked to only one identifier maintained at the central system.

Once the customer selects the indicia, or an article bearing the indicia, the customer provides payment for the service value associated with the identifier represented by the indicia. For example, the customer pays $25 for a $25 card associated with an identifier associated with a $25 service value (e.g., the identifier may be printed on the card, e.g., beneath a scratch-off adhesive to obscure it from view). The merchant sends a communication to the central system confirming the transaction with the customer so that the identifier at the central system can be activated. Customer account identification information may also be passed to the central system so that the central system may identify the target account to which the value will be added. For instance, the customer may enter the phone number corresponding to a telecommunications service account at a POS device, and the POS device may transmit this information to the central system.

When the identifier and customer account information are identified, the central system may communicate with the customer's account provider system to add the service value to the customer's account. The act of causing the value to be added to the customer's account is sometimes referred to herein as "value insertion" because value is being inserted into the customer's account. In some cases, the account provider system may be separate from the central system. In other cases, the central system may comprise a provider system that provides the customer account. In these cases, value may be inserted into the customer account without communicating with an external account provider.

Following the value insertion, the customer's updated account information may be obtained and provided to the customer. For instance, the value insertion process may occur within a very short timeframe (e.g., 0.1 to 10 seconds), and a confirmation that the value was added to the customer account may be passed back to the merchant (e.g., at the merchant POS terminal). Confirmation may be output to the customer, e.g., by printing a receipt or displaying a confirmation at the POS terminal.

As seen from some of the above examples, the central system may act as an intermediary between the customers, merchants and account providers. The central system may maintain arrangements with several carriers to allow for value insertion, and becomes a broker of prepaid communication services. The customer is benefited by having access to a resource that can be obtained at several points of sale and allows an easy method to replenish service value for a number of participating carriers. The carriers benefit by having a product in the marketplace whereby customers can more easily replenish customer account balances. Lastly, the merchants benefit from increased sales because they are selling a product that is in demand because it is a single product that allows customers have value added directly into their account from a POS device instead of a subsequent phone call with time-consuming and confusing IVR navigation.

In at least one implementation of the invention, the central system may manage at least one relational database of information while also allowing access by the various users of the central system (i.e., customers, merchants, and administrators), to the various features and interfaces of the invention. A relational database system may also allow information contained in different tables to be accessed and shared, while also providing the additional advantage that changes to data contained in one table of a relational database affects the same data in any other table sharing the same data. A table is a collection of several data records with similar data information fields. Data records represent a collection of data that is organized into fields. These fields may also be formatted to receive data of varying types. Accordingly, the central system, or a user of the system, can process, query or report data contained in the various data tables and records for use in accomplishing the features of the invention. In one aspect of the invention, the various databases could include the set of identifiers and Mobile Identification Numbers ("MINs"), for example.

Method for Supplying Communication Service Value

In accordance with one embodiment of the invention, an illustrative flowchart showing a method for supplying communication service is shown in FIG. 1 and described below.

The process begins in step S1, and passes to step S20, which includes establishing a set of identifiers having associated service values. As described above, each identifier forms a part of a data record, or identifier record, that allows the central system to identify the specific associated service value that will later be sold to a customer. One example of an identifier is a Personal Identification Number ("PIN"). The PIN comprises one field of the identifier record, while another field in the same identifier record contains the associated service value. Illustratively, record X may have identifier ABC and an associated service value of $25. The service value is preferably a monetary figure (i.e., an amount in dollars, $10, $25 or $50, for example), but may also represent some unit of service usage, if supported by the carrier systems (i.e., minutes).

The set of identifiers forms the identifier database. Each identifier record may also contain fields for Status Indicator (i.e., whether the identifier is Active or Inactive), Serial Number, Visa Account Network Number (VAN), or a Merchant Code identifying the merchant through which the indicia will be distributed.

Following the establishment of the set of identifiers, in step S40, the process includes distributing indicia of the identifiers to merchants for distribution to customers. As described above, the indicia provides information related to the identifier for several reasons. First, the indicia allows the merchant to communicate to the central system the identifier that must be activated following distribution. Similarly, the information conveyed by the indicia later allows the customer to communicate to the central system the identifier and the service value purchased when the indicia was obtained from the merchant. It should be appreciated that the indicia may also encompass any article bearing such information. In other aspects, the indicia may provide instructions to the customer for communicating with the central system.

The indicia may comprise an article, such as magnetic stripe card, smart card, bar coded card, or any combination thereof. Either the magnetic stripe, chip or bar code would contain information that represents the card's identifier. Therefore, when completing the sale of the card to the customer, the merchant could swipe the card through a network terminal, or alternatively, scan the bar code on the card. The merchant's system would then locate the identifier and notify the central system of the sale of the article bearing the associated identifier.

To allow the customer to utilize the card upon purchase, the card also displays the identifier so that the customer can communicate the identifier to the central system. In addition, the card should display the service value associated with the identifier represented on the card to facilitate the customer's purchase of the correct card. Lastly, the card should contain instructions for communicating with the central system, i.e., a general toll-free number.

The indicia may also be provided to the customer through the delivery of a receipt or other notice. In such an embodiment, the customer would commence a purchase transaction at the point of sale, either through the merchant or a system device, such as a verifone terminal. The customer would request a certain prepaid service value, and upon payment, the central system would deliver the identifier to the point of sale for distribution to the customer.

Then, in step S60, the process includes activating an identifier upon distribution of indicia to a customer. As described above, the identifiers may be activated following communication from the merchants of the indicia distribution to the customers. This measure assists in avoiding the theft of the indicia prior to payment. The activation may include changing a status indicator associated with the specific identifier record from Inactive to Active. The communication between the merchant and central system preferably comprises a "host-to-host or Visanet connection", but may include any network communication wherein the central system receives input from the merchant system confirming the transaction. Accordingly, the features of the present invention may use or be combined with any of the features described in U.S. application Ser. No. 09/641,363, filed Aug. 18, 2000, which is incorporated herein by reference in its entirety.

In step S80, a request from the customer for adding the service value associated with the identifier to a customer account may be received, e.g., by the central system. The request may occur during a transaction involving the distribution of the indicia to the customer. For instance, this may occur when a POS terminal transmits value data and/or customer identification data (such as a telephone number associated with a customer telecommunications service account) to the central system.

In some embodiments, communication with the central system may be achieved via any suitable communication interface, Ethernet connection, modem, telephone, digital or analog connections with the system using wireless communication devices (i.e., mobile phones, PDAs, or other handheld wireless communication devices), point of sale device or transceiver device (i.e., a verifone terminal, for example), token ring, Internet or Intranet or other computer connection, or any other suitable connection that allows the customer to receive input from and send output to the central system through the network connection.

Figure 2:
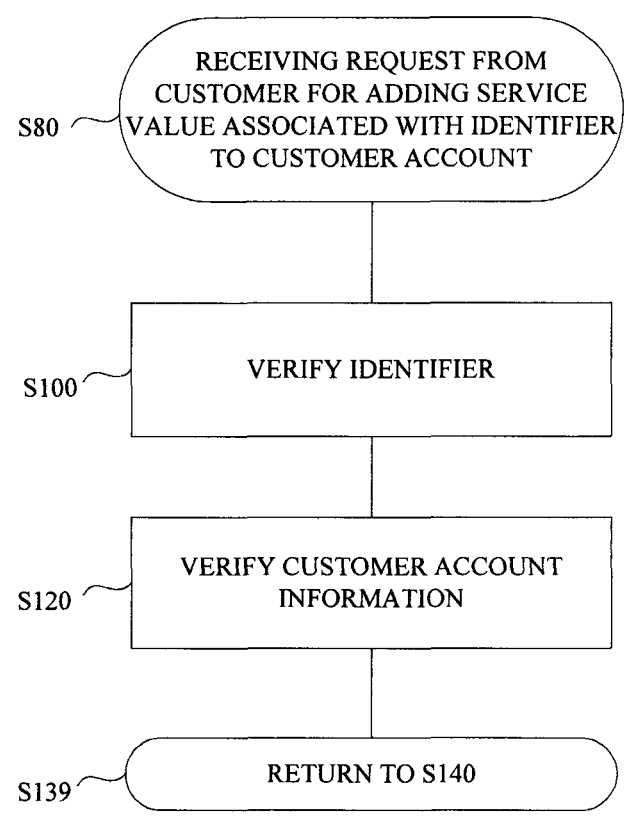
FIG. 2 is a flowchart showing the "receiving request from customer for adding service value associated with identifier to customer account" step of FIG. 1 in further detail in accordance with one embodiment of the invention.

FIG. 2 is a flowchart showing the "receiving request from customer for adding service value associated with identifier to customer account" step of FIG. 1 in further detail in accordance with one embodiment of the invention. The request from the customer to add the service value to the customer's account must include a value identifier (e.g., value identification information such as a card number, keycard identifier, card PIN number, dollar amount, or amount of minutes or other units of value) representing the value associated with the purchase. The request may also comprise information identifying the customer's account (e.g., the customer's phone number, ESN, or Mobile Identification Number, which allows the central system to identify the customer's account). Thus, as shown in FIG. 2, the process continues in step S80 and passes to step S100, wherein the identifier is verified. Following verification of the identifier, in step S120, the customer account information is verified.

Figure 3:
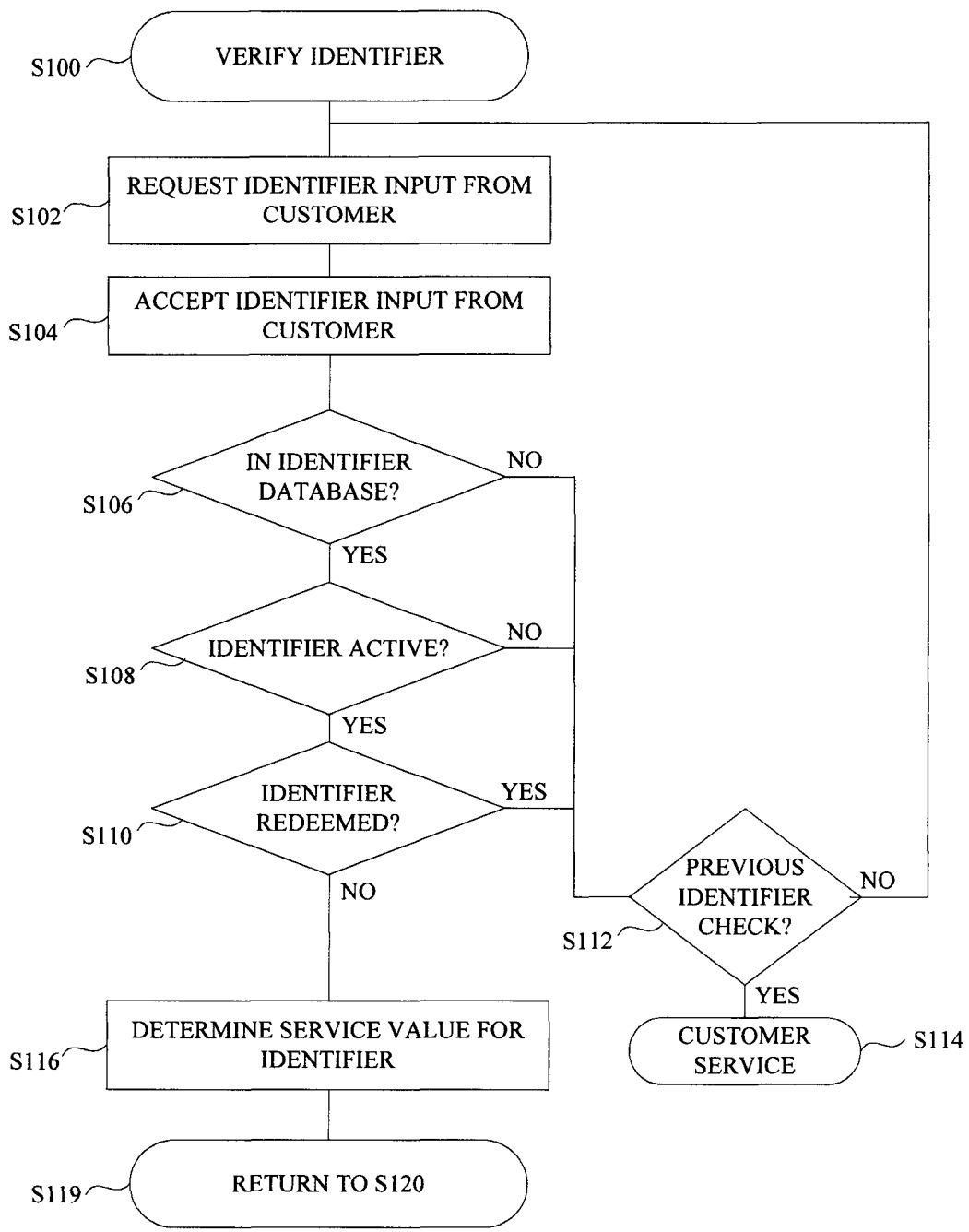
FIG. 3 is a flowchart showing the "verify identifier" step of FIG. 2 in further detail in accordance with one embodiment of the invention.

FIG. 3 is a flowchart showing the "verify identifier" step of FIG. 2 in further detail in accordance with one embodiment of the invention. For instance, in some embodiments, a central system may request that additional customer account identification information be transmitted to the central system. In some embodiments, the central system may request that account and/or value identification information be confirmed, e.g., by entering it again and/or pressing "yes" or "OK" at a confirmation prompt.

As shown in FIG. 3, the process continues in step S100, and passes to step S102, wherein the central processor may request the identifier input from the customer (i.e., prompt at POS device requesting PIN from card, for example). In step S104, the system may accept an identifier input from the customer (e.g., the card number or PIN provided on a purchased card, for example). For instance, the customer may purchase a card at a merchant POS, and the merchant (or customer) may swipe the card at a merchant POS device (such as a credit card reader or other terminal).

In step S106, the system may determine whether the input identifier correlates with an identifier from the set of identifiers maintained by the central system. The central system may compare the received value identifier (e.g., as received from a POS device and/or as provided by the customer (or other entity)) with those kept in the identifier database. If a record containing the PIN is found on the database, the process passes to step S108. If the identifier is found in the database, the system determines whether the identifier is active in step S108. The status of the identifier can be determined by relating a Status Indicator associated with the pertinent identifier record. Thus, when the central system finds the identifier record, it can determine whether a value in the Status Indicator field represents Active or Inactive status. If the identifier is found in the database and is active, the system determines whether the identifier has already been redeemed in step S110. This feature allows the central system to inform the customer that the identifier has already been redeemed. In some circumstances, the customer's communication session with the central system may be ended prematurely, before confirmation of the value insertion procedure. When this occurs, the customer may not be aware that the value insertion function was completed in the prior call. Thus, if the customer had previously called within a certain period (i.e., the last 24 hours), the central system can inform the customer that the value insertion was successful. If the identifier has not been redeemed, the process passes to step S116.

If the identifier cannot be found in the database in step S106, or the identifier is found in the database but is determined to be inactive in step S108, or the identifier is found in the database and is active, but is determined to have already been redeemed in step S110, the process passes to step S112. The system determines whether there has been a previous identifier check in step S112, and if so the process passes to step S114, where the customer is transferred to customer service. A previous identifier check would have occurred if the customer had previously supplied identifier input and the input failed any of the determinations in steps S106, S108 or S110. If there had not been a previous identifier check, the process returns to step S102, where the systems requests that the customer re-enter the identifier input.

For those identifiers found in the system that are active and have not been redeemed, in step S116 the system determines the associated service value for the identifier. The process then passes to step S119, wherein it returns to step S120.

Figure 4:
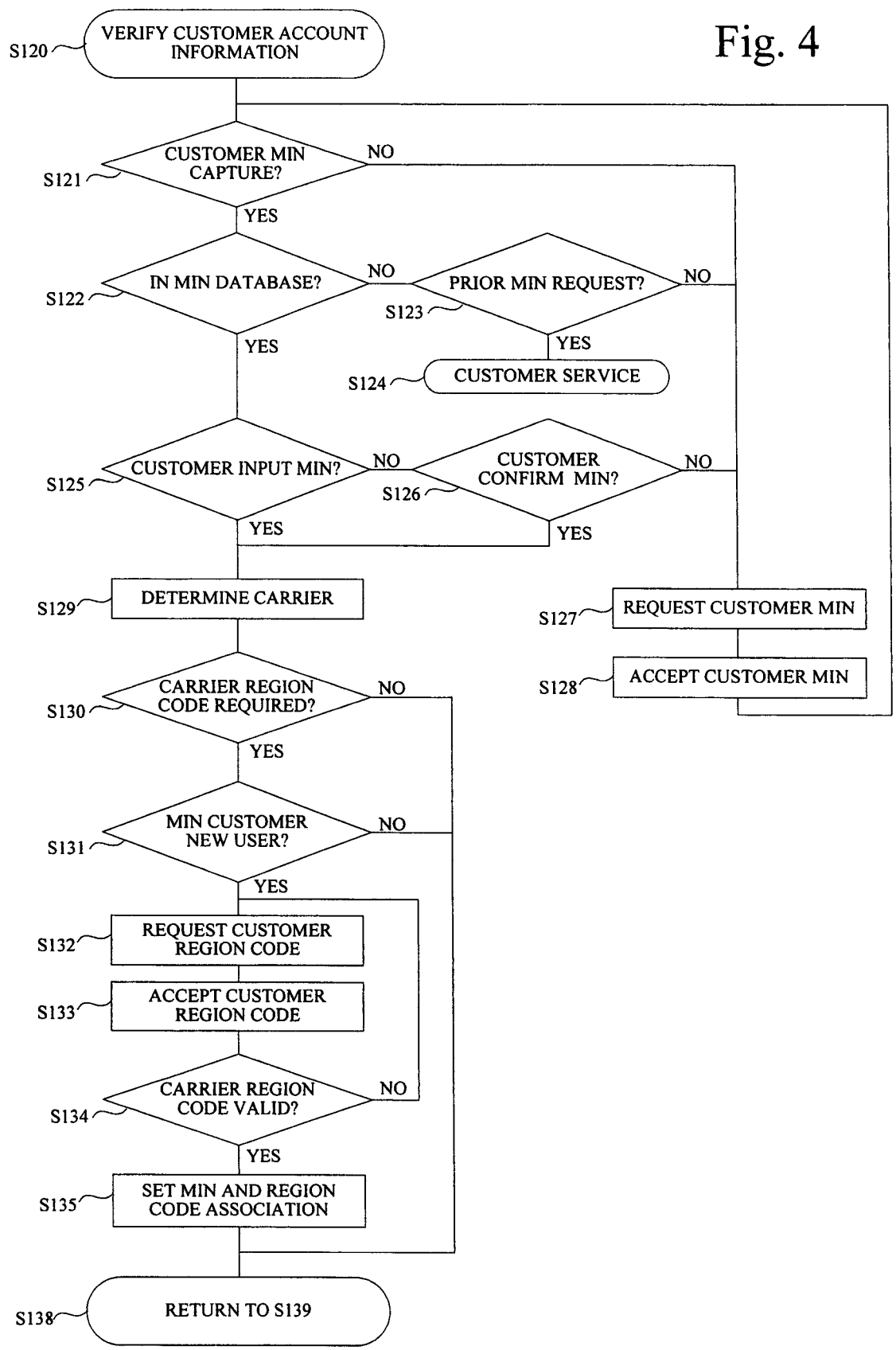
FIG. 4 is a flowchart showing the "verify customer account information" step of FIG. 2 in further detail in accordance with one embodiment of the invention.

FIG. 4 is a flowchart showing the "verify customer account information" step of FIG. 2 in further detail in accordance with one embodiment of the invention. The customer supplies his customer account information to ensure that the service value purchased is credited to the correct customer account (e.g., which may be identified by a Mobile Identification Number ("MIN")) at the correct account provider system (such as a system of a telecommunications carrier that providers customers with communication service value accounts).

As shown in FIG. 4, the process may continue in step S120 and pass to step S121.

Thus, in some embodiments, the system may determine whether the customer MIN (or other account identifier) was captured and/or identified. For instance, it may be identified when customer identification information is passed to the central system in step S121. In some embodiments, wherein the customer contacts the system from a mobile phone (that has an account for which value is to be added), the account corresponding to the targeted account may be identified. For example, the customer's MIN can be captured utilizing Automatic Number Identification ("ANI"), or similar caller ID function. Through ANI, the central system acquires the customer's MIN from the ISDN transmission. Alternatively, the customer may supply his MIN upon request. This would allow the customer to confirm which MIN account the prepaid service value should be credited. In some embodiments, the account identification information may be identified without identifying the actual corresponding account.

It should be understood that a "MIN" is used for exemplary purposes only, and any other account identifier is contemplated herein, such as an account number, phone number, ESN, SMS address, home or work address, name, or other information from which an account may be identified (by using the account identification information alone or in combination with other information). For instance, the central system may identify a specific account from only a last name and a mailing address. In this example, the last name and mailing address may serve the purpose of "account identification information".

If the customer's MIN has not already been captured, the process may pass to step S127. If the MIN has been captured, the process may pass to step S122, wherein the system may determine whether the customer's MIN can be found in the MIN database. The MIN database may comprise a compilation of existing MINs that includes each MIN, as well as an associated carrier. The MIN database may be stored locally in the central system, or maintained externally in a publicly accessible database, such as Telcordia®. This database may also include one created pursuant to the Wireless Local Number Portability Act. If the MIN is not found in the MIN database, the process passes to step S123. In situations when the MIN is not found in the MIN database, the customer may have contacted the central system using a non-wireless phone or other non-telephone connection, the system prompts the customer to enter the MIN that the customer wishes to add the service value. If the MIN is found in the MIN database, the process passes to step S125.

In step S123, the system determines whether the system has previously requested the customer's MIN from the customer. If so, the process passes to step S124, wherein the customer is transferred to customer service personnel. If the customer's MIN has not been previously requested, the process passes to step S127.

In step S125, the system determines whether the customer input his MIN. If so, the process passes to step S129. If not the customer did not input his MIN, the process passes to step S126, wherein the system determines whether the customer MIN has been confirmed. The confirmation includes input from the customer that the MIN identified is the correct account to add the service value. If the MIN is confirmed, the process passes to step S129.

Alternatively, if the customer MIN is not confirmed, the process passes to step S127, wherein the system requests that the customer provide input representing the customer's MIN for which the service value addition is requested. Then, in step S128, the system accepts the customer's MIN input before returning to step S121.

In step S129, the system determines the account provider (such as the carrier that provides a telecommunications account to the customer). The carrier can be determined by locating the MIN identified in the MIN database and relating the associated carrier. (It should be appreciated that while a "carrier" that provides telecommunications service accounts is being used as an example, any account provider is contemplated herein, such as toll service account providers, emergency road service account providers, Internet service account providers, stored value card account providers, and any other account provider.)

Once the carrier is determined, in step S130, the system may determine whether the customer ought to supply a carrier region code based on the customer's carrier. If not, the process may skip to step S138. If the carrier region code is required, the system may request the customer's carrier region code in step S132. The carrier region code may be required for carriers that have regional centers that maintain data on the local mobile phone customers. The carrier region code may be represented by the customer's zip code.

In step S133, the system may accept the customer's carrier region code, and the process may pass to the step S134. The system may determine whether the carrier region code is valid in step S134. The code may be presumed valid if it can be related to a region code maintained in a carrier specific region code database. If the code is simply the customer's zip code, the system can determine the appropriate carrier region by referring to the carrier database. If the code is not valid, the process returns to step S132, wherein the system requests reentry of the region code. If the code is valid, the process passes to step S135, wherein the system sets an association between the customer's MIN and the carrier region code, to avoid later requests of the code upon subsequent interactions. The process then passes to step S138, wherein it returns to step S139.

After receiving the customer's request, in step S140, the process may include adding the associated service value to the customer account.

Figure 5:
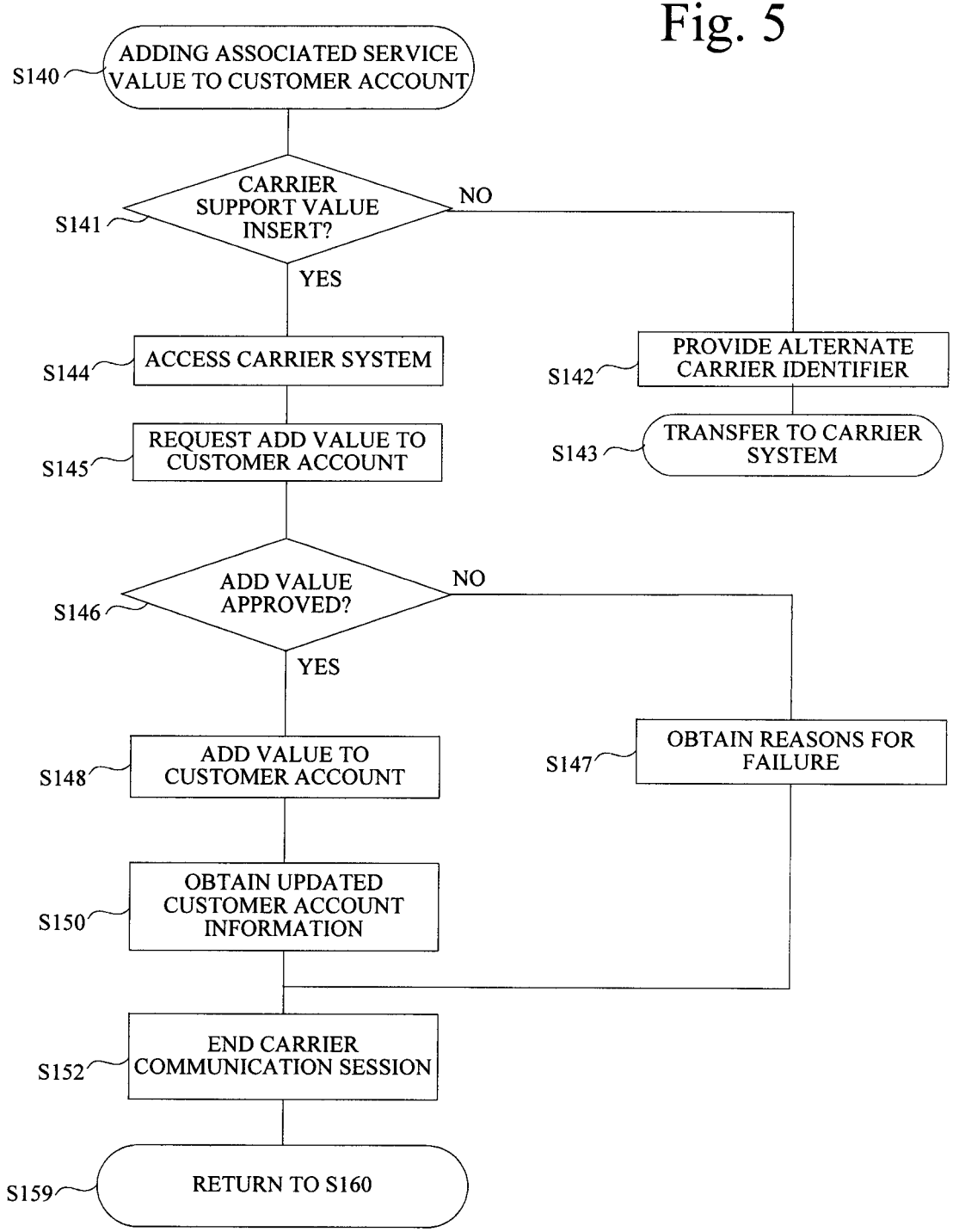
FIG. 5 is a flowchart showing the "adding associated service value to customer account" step of FIG. 1 in further detail in accordance with one embodiment of the invention.

FIG. 5 is a flowchart showing the "adding associated service value to customer account" step of FIG. 1 in further detail in accordance with one embodiment of the invention. The process continues in step S140 and then may pass to step S141, wherein the system may determine whether the customer's carrier supports value insertion of service value into its customers' accounts. If the carrier does support direct value insertion, the process passes to step S144, wherein the system access the carrier system. Then, in step S145, the system requests approval from the carrier system to add the service value associated with the identifier to the customer's account. In step S146, the system determines whether the add value request is approved. If so, the process passes to step S148, wherein the system adds the service value to the customer's account, and then passes to step S150, wherein the system obtains updated customer account information from the carrier system. This updated account information may include the new account balance, as well as the account's expiration date, for example. The process then passes to step S152.

However, if in step S146, the system determines that the add value request was not approved, the process passes to step S147, wherein the system obtains the reasons from the carrier system that the value insertion was not approved. The process then passes to step S152, wherein the system ends the communication session with the carrier system. The process then passes to step S159, wherein it returns to step S160.

For those carriers that do not support direct value insertion, in step S142, the system provides the customer with an alternate carrier identifier. This carrier identifier operates similarly to the identifier used with the central system, however, the carrier identifier must be redeemed through communication with the carrier system. These carrier identifiers may be maintained in a separate carrier identifier database. Accordingly, in step S143, the system transfers the customer to an IVR system managed by the carrier system to complete the value redemption.

Returning to FIG. 1, in step S160, the process includes providing the customer with a customer account summary.

Figure 6:
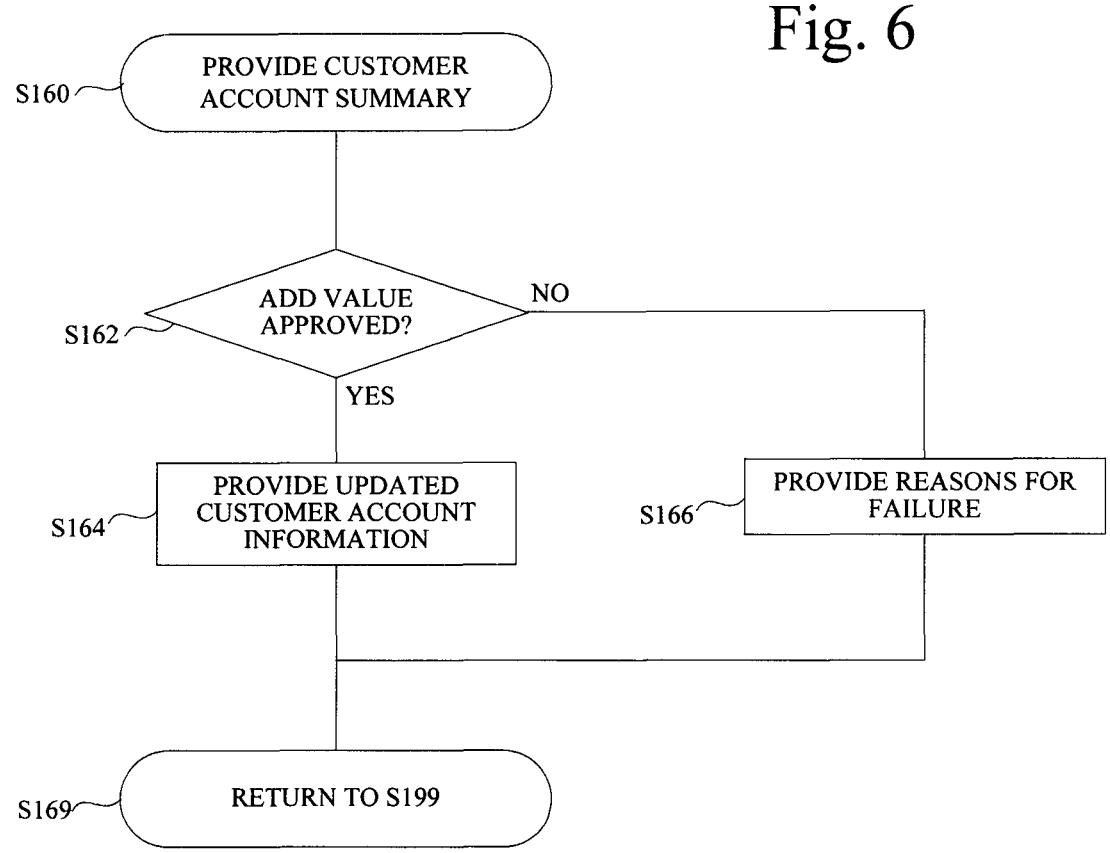
FIG. 6 is a flowchart showing the "provide customer account summary" step of FIG. 1 in further detail in accordance with one embodiment of the invention.

FIG. 6 is a flowchart showing the "provide customer account summary" step of FIG. 1 in further detail in accordance with one embodiment of the invention. The process continues in step S160, and then passes to step S162, wherein the system determines whether the value insertion was approved by the carriers system. If so, the process passes to the step S164, wherein the system provides the updated customer account information to the customer. The process then passes to step S169. If the value insertion was not approved, the process passes to step S166, wherein the system provides the customer with the reasons for the denial of the request. These reasons may include that the customer's balance in the customer account is already too high or exceeds a predefined limit, the account cannot be found by the carrier, the account has been cancelled or any unspecified carrier error. The process then passes to step S169, where it returns to step S199. Once the system provides the customer with the customer account summary, the process passes to step S199, where it ends.

It should be appreciated that the methods described herein may be adapted such that each indicia of an identifier distributed may not have a predetermined associated service value. In this respect, the indicia would include the identifier, however, the customer would be allowed to select a service value to purchase for the card. Therefore, upon distribution of the card, the customer would select a service value, such as $25, for insertion into the record at the central system. The communication from the merchant would notify the central system of the amount purchased, which would then be inserted into the associated service value field for the record.

An Illustrative Communication Service Value System

Figure 7:
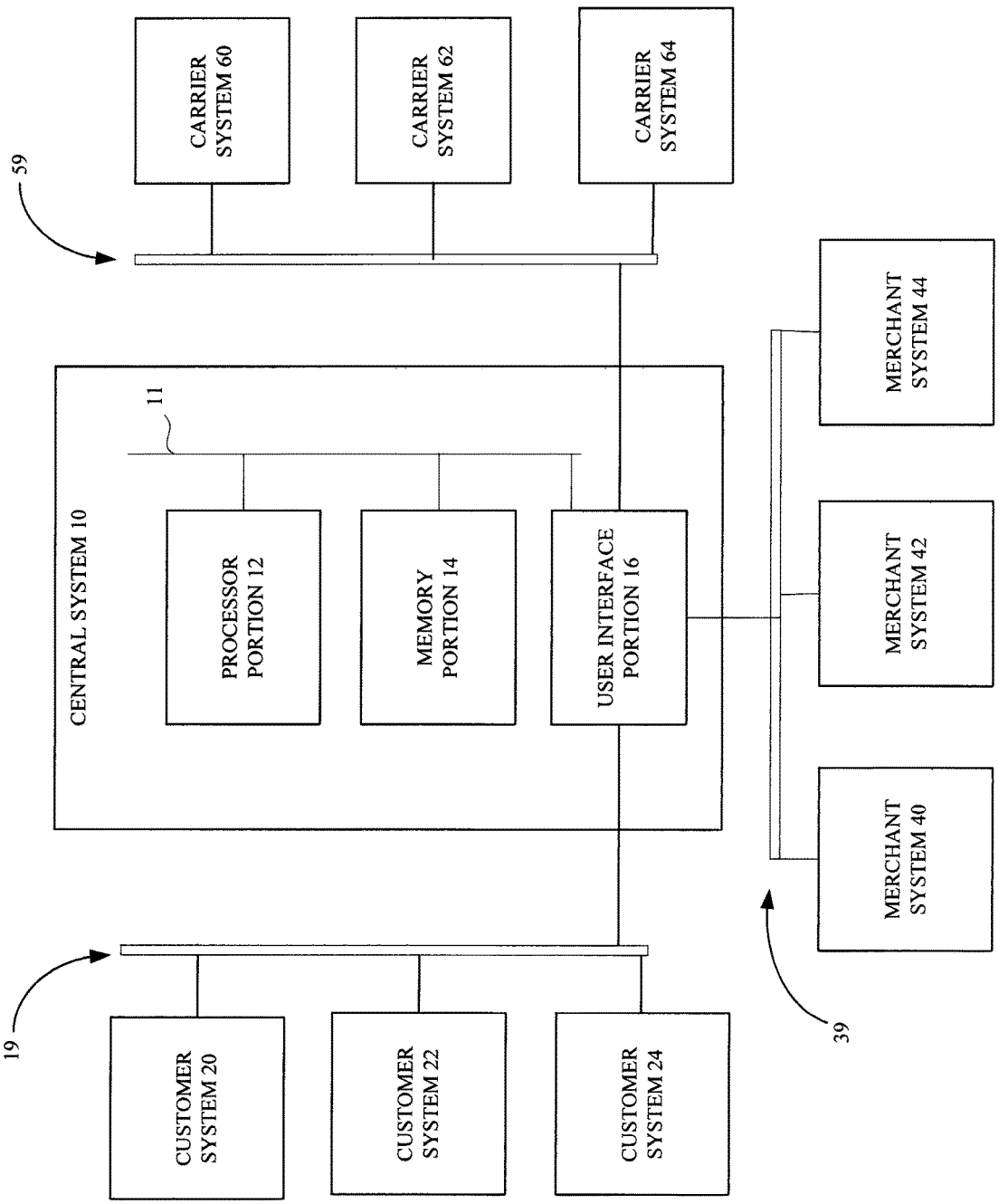
FIG. 7 is a diagram showing an illustrative system for supplying communication service in accordance with one embodiment of the invention.

As described above, FIG. 7 is a diagram showing an illustrative system for supplying communication service value in accordance with one embodiment of the invention. FIG. 7 illustrates a central system 10, a plurality of customer systems 20, 22, and 24, a plurality of merchant systems 40, 42, and 44 (e.g., comprising POS terminals), and a plurality of carrier systems 60, 62, and 64. Each customer system 20, 22 and 24 may be in selective communication with the central system 10 through customer network 19. Each merchant system 40, 42 and 44 may be in selective communication with the central system 10 through merchant network 39. Each carrier system 60, 62 and 64 is in selective communication with the central system 10 through carrier network 59. It should be appreciated that customer network 19, merchant network 39 and carrier network 59 may be the same network in some embodiments of the invention.

The central system 10 may comprise a processor portion 12 for processing input from and generating output to the various customer, merchant and carrier systems in communication with the central system 10, a memory portion 14, the processor portion 12 retrieving data from and storing data for use by the central system 10 in the memory portion 14, and a user interface portion 16 accepting input from and transmitting output to the various customer, merchant and carrier systems in communication with the central system 10. Each of processor portion 12, memory portion 14 and user interface portion 16 are connected to and in communication with each other through a data bus 11.

The processor portion 12 monitors and controls the various operations of the central system 10. Initially, the processor portion 12 processes the information provided by the merchant system 40 when confirming the indicia distribution and the customer system 20 when accessing, or making requests of, the central system 10.

The memory portion 14 serves as a memory store for a wide variety of data used by the processor portion 12, as well as the other components of the central system 10. For example, in one embodiment, the memory portion 14 contains the various databases of identifiers and associated service values, MINs, carriers, and other information needed by the central system. It should be appreciated that the various memory components contained in the memory portion 14 may take on a variety of architectures as is necessary or desired by the particular operating circumstances. Further, the various memory components of the memory portion 14 may exchange data or utilize other memory component data utilizing known techniques such as relational database techniques.

The user interface portion 16 provides the interface through which the user can provide input to and receive output from the central system 10. The user interface portion 16 generally provides interaction capabilities for communicating with the customer, merchant and carrier systems. The user interface portion 16 is controlled by the processor portion 12, or components thereof, to interface with a customer or other operating system, including inputting and outputting data or information relating to the central system 10. The user interface portion 16 also provides the interface between the system administrator, the central system 10, and other remote systems. A system administrator mainly utilizes the user interface portion 16 to manage the storage of data and information in the memory portion 14, as well as provide updates to the central system 10 applications and functions.

In operation, a customer utilizing a suitable customer system 20 accesses the central system 10 through customer network 19. The customer system 20 may be any suitable processing machine, such as a mobile phone, as well as a computer accessing the Internet, personal digital assistants (PDAs) or other wireless communication device, networked to customer network 19. The merchant system 40 may be any suitable processing machine, including a transceiver device (i.e., a verifone terminal, for example) capable of receiving input from the central system, printing indicia or other information, performing smart card or magnetic stripe card reader or bar code scanner functions, and sending output to the central system 10. Accordingly, in one embodiment of the invention, to activate an identifier upon payment, the card is swiped through an appropriate card interface on the merchant transceiver, which initiates a network connection to the central system 10, wherein the central system 10 activates the identifier in the appropriate database.

The user interface portion 16 also transmits data to the customer system 20 to present a user interface on the customer system 20 for accepting input and allowing the customer to submit output to the central system 10. Although these user interfaces have been described with respect to a some interfaces, alternate user interfaces may be presented on an Internet web page whereby customers access the page and provide the necessary redemption information on an appropriate form.

Although several customer systems and vendor systems are shown in FIG. 7, it should be appreciated that in some embodiments of the invention, there may be only one customer system and one vendor system, each in selective network communication with the central system 10.

The user interface portion 16 accepts the customer request for value insertion from the customer system 20, including the identifier input and customer account input. The processor portion 12 verifies the identifier input with the identifier database maintained in the memory portion 14, and then verifies the customer account input with the MIN database, either maintained locally in the memory portion 14 or externally in a publicly available database of MINs. The user interface portion 16 then communicates with a carrier system 60 to complete the value insertion process before providing the customer with a customer account summary.

It should also be appreciated that the invention may include a device for distributing communication service value. Such a device may include a distribution terminal (i.e., a verifone terminal-like device or a vending machine-like apparatus) that allows a customer to select a prepaid service value for purchase, and make payment for the service value. The terminal would include a product selection portion for presenting the various service value denominations available (i.e., any user interface for accepting the customer's selection, for example), a payment portion for receiving payment from the customer (i.e., through cash, or magnetic stripe card or smart card readers, for example), a communication portion for notifying the central system of the sale of the indicia and the need to activate the associated identifier (i.e., a modem, for example), and a delivery portion for providing the customer with the indicia of the identifier (i.e., a mechanical card delivery system or printer means to provide a printout of the indicia, for example).

As described above, FIGS. 1-6 illustrate various embodiments of the method of the invention. FIG. 7 represents an illustrative embodiment of the system of the invention. It should be appreciated that the system of the invention or portions of the system of the invention may be in the form of a "processing machine," such as a general purpose computer or other network operating system, for example. As used herein, the term "processing machine" is to be understood to include at least one processor that uses at least one memory. That at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process of the invention.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, a dedicated circuit, IP based connection, the Internet, Intranet, Extranet, LAN, WAN, VPN, an Ethernet, or any client server system that provides communication, for example. Such communications technologies may use any suitable protocol such as TCP/IP, UDP, OSI, SNA, X.25, ISO 85/83, XML or SOAP, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may comprise a series of Interactive Voice Responses, or take the form of a dialogue screen, for example. A user interface may be in the form of a web page or other interactive application presented on a customer system by the customer's browser. The web page or application could include fields for accepting data and transmitting data to the advertising marketing system for storage. A user interface may also include any of a mouse, touch screen, keyboard, keypad, card slot, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

Figure 8:
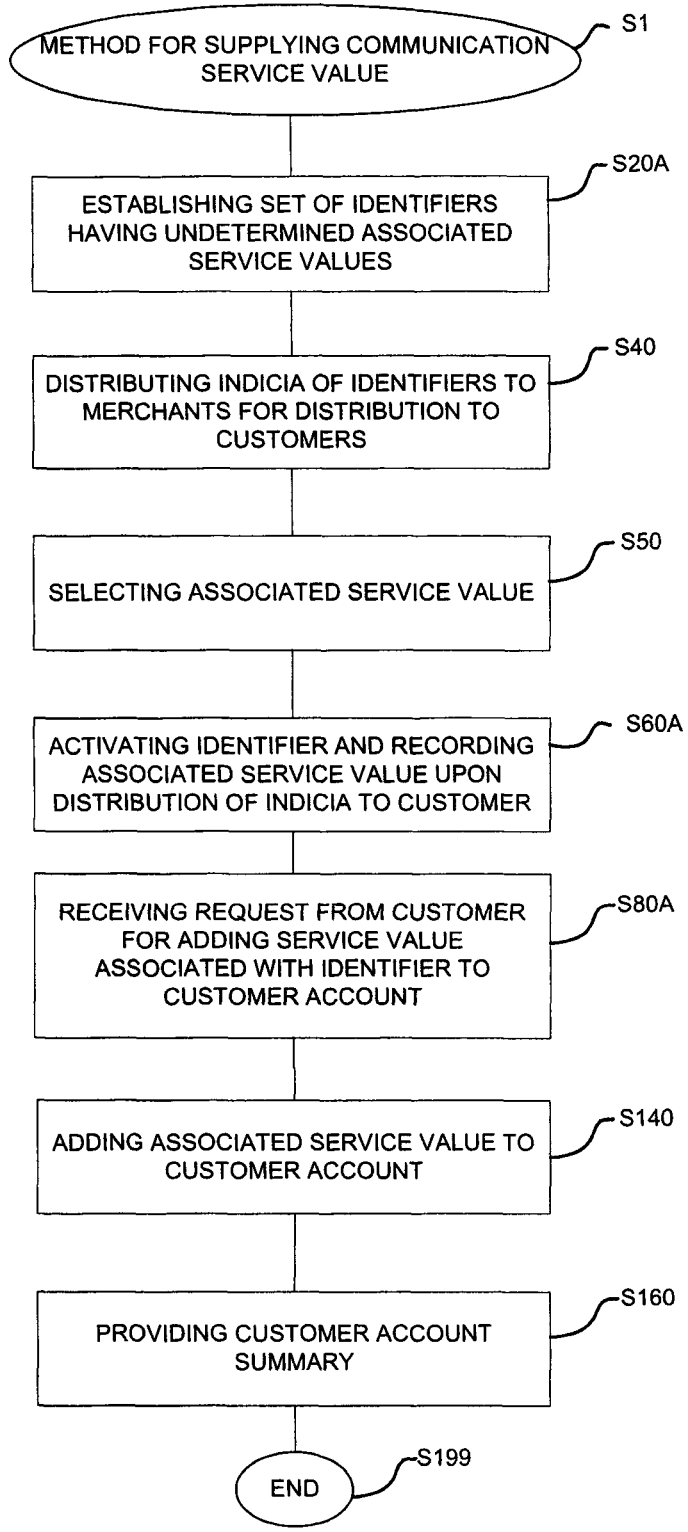
FIG. 8 is a flowchart showing a method for supplying communication service according to an embodiment of the invention.

FIG. 8 is a flowchart showing a method for supplying communication service. This method is very similar to the method of FIG. 1, described above. However, in this embodiment, the associated service value is not initially pre-established, but instead it is determined when it is selected by a customer at the time of distribution of the identifiers to the customer. In this respect, the indicia would include the identifier; however, the customer would be allowed to select a service value, such as $25 or $50, for insertion into the record at the central system. As previously noted, the service value could alternately be a another unit of service usage, such as a number of minutes. The communication from the merchant would notify the central system of the amount purchased, and this information would then be inserted into the associated service value field for the record.

Thus, as shown in FIG. 8, a set of identifiers having undetermined associated service values is established, in step S20A. Then in step S40, as also shown in FIG. 1, the indicia of identifiers to merchants for distribution to customers is distributed. Unlike in FIG. 1, the process proceeds to step S50, where the customer selects the associated service value, such as $10, $25, or $50. Then in step S60A, the identifiers are activated and the associated service value is recorded when the indicia is distributed to the customer. In step S80A, the request from the customer for adding service value associated with the identifier to the customer's account is received. This step is further elaborated in FIG. 9, discussed below. Finally, the associated service value is added to the customer account in step S140, and the customer account summary is provided in step S160.

FIG. 9 is a flowchart showing the "receiving request from customer for adding service value associated with identifier to customer account" step of FIG. 8 in further detail in accordance with one embodiment of the invention. This flowchart further elaborates step S80A shown in FIG. 8. The flowchart of FIG. 8 follows the same process as described in FIG. 2, above. However, in this embodiment, it is explicitly shown that after the identifier is verified, in step S100, the customer selects a carrier for service from among a plurality of carriers is received, in step S101. The process then proceeds with step S120 as in FIG. 2 when the customer account information is verified.

FIG. 10 is a flowchart showing a method of inserting value and recharging a stored-value account according to the present invention. The steps of this process should be read in conjunction with the other figures, in particular FIG. 1 and its related figures.

In step 1001, the customer selects a card. The customer may select the card from among a plurality of different cards. The cards may be associated with different values and different providers. The cards are associated with one or more prepaid services, such as wireless telecommunications service. For instance, the customer may select a card enabling $40 of wireless telephone service with a particular provider.

In a preferred embodiment, the card has an associated PIN, serial number (in the form of a barcode or a magnetically stored number), and a card number.

The PIN or other numbers may be hidden on the card so that they are not visible until after purchase. For instance, the PIN may have material covering and hiding it, wherein the material may be scratched off with a coin after purchase. Alternately, an opaque adhesive tape may be used to temporarily prevent viewing the PIN until after purchase. These and other methods for securing valuable card information are well-known in the art.

The PIN may be a unique identifier, such as a randomly generated number that is unique to the specific card. The associated barcode number may also be printed on the card so that it can be scanned (or swiped) at a merchant terminal at the point of sale. The use of barcodes and magnetic stripes are well-known in the art. The card number may be another number associated with the card for other purposes. For instance, it may be a provider routing number. It may also be a number printed on the card in accordance with governmental guidelines or other norms.

The card information, such as the PIN number, associated barcode and/or magnetically stored serial number, value, and card number may be stored in a database at the central processor. These numbers may be associated together in a single entry for a single stored-value card. By associating them together in a single entry, the central processor may later determine the other associated numbers after receiving a single number, such as the PIN.

These numbers and other indicia may be printed on the card. For instance, the name of the service provider and the value of the card may be printed on the card. The card may also show activation information instructing the customer how to activate the card. Redemption information may comprise a 1-800 number (or other 8xxx number or other phone number), an IVR input code or series of inputs, a website, and/or other information or instructions for accessing a central system and/or redeeming the card or otherwise modifying a customer account. The redemption instruction information may be printed on the card, or it may be printed on a receipt and provided to the customer upon purchase of the card.

Different instructions may be associated with different cards. For instance, cards associated with one service provider may have different instructions, such as a different 1-800 number, than a card associated with a different service provider. Different 1-800 numbers, websites, or inputs enable the central processor to distinguish the identity of the provider or other feature of the card based on the method used to access the central system.

In step 1002, the customer purchases the card. The merchant (or customer) scans the card's barcode, swipes the card's magnetic strip, and/or otherwise inputs card information at a terminal, such as a merchant terminal. If the card is not pre-associated with a specific value, the customer may specify a particular value which may then be input at the terminal. This defined value would then become the card's associated value, unless and until the associated value were later changed by the customer, merchant, central processor, or provider.

The merchant terminal transmits this card information to the central processor. The merchant terminal may include other information in the transmission, such as merchant or terminal identification information, other indicia information on the card, or customer information such as name and account number. This transmission may be either a request to activate the card or a request to preauthorize the card (which may then follow with a related authorization request). A preauthorization request may merely query the central processor whether the card is a valid card that is ready to be activated.

In step 1003, the central processor receives information from the merchant terminal. This information may comprise card information and customer account information, such as a customer phone number. For instance, a terminal may read card information from the card and send the card information to a central processor. Customer account information may also be input at the terminal. For instance, the phone number may be entered into a POS terminal, and the phone number may be passed to a central processor (e.g., in the same or separate communication as passing the card information to the same central processor).

This information may comprise any information input at the terminal as well as any additional information passed from the terminal. In a preferred embodiment, the received information comprises the card's barcode or magnetic strip information. The central processor accesses the database entry corresponding to the card. It may check the status of the card. For instance, it may check whether the card is a valid card that is ready to be activated. It may also verify whether the card has been lost or stolen, or whether there is a database entry corresponding to the card information. It may also check whether the card is associated with the merchant or requesting terminal; for instance, it may check received terminal information against terminal information stored in the card's entry in the database. In a preferred embodiment, the central processor verifies that the terminal is an authorized terminal, such as a trusted source, for making stored-value card requests (or that the communication network used to make the request is a trusted communication network). For instance, if the merchant transmits a merchant identifier along with the card information, the central processor may verify that the merchant identifier is associated with the card information in the database. At this point, the central processor may send a pre-authorization back to the merchant terminal.

At this point, the central processor may preauthorize the card if the transmission from the merchant terminal was a preauthorization request. For instance, the central processor may preauthorize a card that is valid and ready to be issued. It may also make an amendment to the entry to indicate that the card has been preauthorized by a particular terminal. The preauthorization may be passed from the central processor to the merchant terminal. At this point, the card has not been purchased.

The merchant terminal may then receive the preauthorization and allow the customer to proceed with the purchase. For instance, the merchant terminal may collect funds from the customer, e.g., in a credit card or cash transaction. Before, during, or after this time (such as when the customer's funds have cleared or after), the merchant terminal may then send an authorization/activation request to the central processor. The central processor may receive the authorization request, which may include card information and merchant or terminal information (as described herein), and process the information.

The central processor may then amend the stored-value card entry corresponding to the received card information. The central processor may then activate and/or register the card. For example, the central processor may amend the entry to show that the card has been registered and/or activated. By activating and/or registering the card, the central processor acknowledges that the card has been properly purchased at a merchant terminal. When the customer later attempts to redeem the card and/or add value to a customer account (or otherwise amend a customer account), the central processor may deny the request if the card has not been validly issued or activated. This prevents theft of the cards, because a stolen card cannot be activated. The central processor may send a transaction confirmation to the merchant terminal, which may pass a confirmation to the customer. In some cases, the authorization will occur long after the preauthorization (such as after a check clears), so a confirmation will not be passed to the customer.

If a PIN is not pre-printed on the card, the central processor may also transmit a PIN to the merchant terminal upon activation of the card. The merchant terminal may then distribute the PIN to the customer, such as on a printed receipt. The central processor would then associate the PIN with the card, for example by storing the PIN in the card entry (or vice versa).

A preauthorization step is advantageous for theft and loss prevention. Without a preauthorization step, it was possible to redeem a card before paying for it. For instance, the card could be redeemed during the delay between when the card is processed (e.g., scanned and activated) and when the card is paid for (either by the merchant or by the customer). The delay may comprise the time it takes for a credit card or check to be processed, or it may comprise the time at the checkout counter between when the card is scanned and the time the customer is actually charged. However, only an activated/authorized card can be redeemed, not a preauthorized card. By doing a preauthorization at the time of scanning (or otherwise inputting card information at the merchant terminal), users cannot exploit this delay for illicit purposes. Then, when the card is activated, the funds may already be transferred, so the customer may not redeem value that has not been properly purchased.

It should be appreciated that steps 1002 and 1003 may involve back-and-forth communication between the merchant terminal and the central processor, including preauthorization and authorization/activation requests and responses.

In step 1004, the customer accesses the central processor system. For instance, the customer may access the central processor to request to redeem the associated value. The central processor may comprise an IVR phone system or a central website associated with the central processor. The central processor system may also comprise any other means for communication between a customer and a central system known in the art. For purposes of the description herein, the central IVR and central website may be considered part of the general central processor system, along with the central processor database.

In optional step 1005, the central system prompts the customer for information. The prompt may be a prompt at a POS terminal. The prompt may also be at a customer's mobile phone (e.g., wherein the mobile phone has a mobile phone number already provided by the customer and/or on record with the central system). In some embodiments, the prompt may comprise instructions on a website, such as an input field on a website. The prompt may comprise any query by the central processor requesting information from the customer, such as a request to verify account identification information. The prompt may ask for any information associated with the card (e.g., a purchased card having associated value), the service, or the customer, such as the PIN, associated value, and customer name, phone number or account number. For instance, the customer may be prompted for the identity of the provider. This and other information may also be automatically determined as described herein.

In step 1006, the information is provided to the central system, such as by passing information from the merchant (e.g., the merchant terminal) to the central system (e.g., in response to the prompts). In a preferred embodiment, the customer may enter the card's PIN number and/or the customer's account number or phone number at a POS device, and this information may be passed from the POS device to the central processor.

In step 1007, the central processor may identify the service provider associated with the customer account and the customer account number. The central processor may also identify other information such as the serial number, other card indicia, value, customer name, address, social security number, or other customer or account information. This information may be identified based on customer input.

Some of the information may be automatically determined by the central system. This information therefore does not require prompts or customer input. For wireless telecommunication service, the account number may be the customer's mobile phone number or mobile identification number (MIN). Identification information such as a MIN may be ascertained by automatic number identification (ANI). For instance, if the customer calls an 800 number from the customer's wireless telephone, the central system may identify the account associated with the wireless telephone number. For telephone long distance service, the central system may similarly identify an account associated with the telephone number. (It should be noted that ANI may be used to identify a merchant and/or merchant terminal if the merchant terminal sends information to the central system via phone. For instance, a database linked to the central processor may store a table or other database that associates different merchant phone numbers (or terminal phone numbers) with specific merchants. In this way, a merchant may be identified.

The identity of the provider may also be determined automatically. For instance, as described above, the provider may be identified by the manner in which the customer accesses the central system. For instance, a particular 1-800 number (or similar number) may be associated with a particular provider. Thus, when the central system receives a call from a customer at that number, it may automatically determine that a customer's account must be associated with the particular provider.

The information received and identified by the central processor may be stored in a database, such as in the database entry for the associated card, where the different items of information are associated together. One piece of identifying information associated with the card may enable the central processor to identify other associated card or account information stored in the database entry.

It should be understood that steps 1005-1007 may involve back-and-forth communication between the customer and central system, and they may therefore overlap and occur over the same time period.

In step 1008, the central processor inserts value information into the provider's system. If the customer's account can be modified directly by the central system, then the central system amends the customer's account and adds the value. For instance, the central processor may be the provider or an affiliate of the provider and accordingly have managerial control over the accounts. In this case, it may add value to the accounts directly.

It may also store amended account information, account history information, and other account information according to well-known methods in the art.

If the customer's account cannot be modified directly by the central system, then the central processor may "insert value" by passing value insertion information to the provider's system to enable the provider's system to process the customer's request to add value. In a preferred embodiment, this information comprises the customer account and the associated value. For example, the information may instruct the provider to add a certain amount (the associated value) to a specific account (the customer's account).

In order to pass the information to the provider, the central processor may access a database of the provider, wherein the provider database stores stored-value account information for user accounts associated with the provider, such as wireless service accounts. The central processor may also access the provider's website or other computer interface.

In one embodiment, the central processor uses an internet protocol and/or file transfer protocol to transfer stored-value card and/or PIN data of the user. For instance, the central processor may send an xml request to the provider's computer platform. Alternately, the request may be via email, ftp, or other means. The request may conform to the provider's application programming interface (API) or other formatting requirements. The request may comprise accessing a provider's IVR system or website and/or inputting information at prompts from the provider system. The processor may make any appropriate inputs to add value to a customer's stored-value account. The central processor may pass PIN and/or other account-related information to the provider (and/or its database), such as a PIN, user name, address, account number, wireless telephone number, password, or other information. For instance, the central processor may instruct the provider to add a certain amount to a user's stored-value account. This may occur during the same time frame as the original value insertion request from a POS terminal.

In step 1009, the provider adds the associated value to the customer account. This step is not necessary if value has already been added to the customer account in step 1008, such as if the central system manages the customer's account directly.

The third-party provider may first receive information from the central processor passed in step 1008. To add value, the provider may amend its customer account records (such as those stored in a database) to reflect the passed information, such as an increased value in a customer account. The provider may also send a transaction confirmation to the central processor via similar communication means, such as via xml. The confirmation may confirm that the PIN-related transaction was (or was not) completed successfully.

After value is added to (or inserted into) the account, the processor and/or provider may provide a transaction confirmation to the customer. The confirmation may comprise a positive or negative response, a new account balance, or other account- or card-related information. A negative response may result when the carrier doesn't recognize the account, the customer's account has been deactivated, the account has been suspended, or when other negative or questionable circumstances are present.

In step 1010, the customer uses the same stored-value card in a subsequent transaction. For instance, the card may be scanned or swiped at a second merchant terminal, and it may proceed in a manner similar to step 1002. I.e., the merchant may input card information and transmit information to the central processor. This terminal may or may not be the same as the first terminal, and it may be located at a different merchant's store.

Alternately, the central processor may receive card information over the internet, email, phone, POS terminal, or other communication means. For instance, a customer may log onto a website associated with the central processor and input card information, such as the card number or PIN. The customer may use any means for communicating with central processor, including a phone, PDA, computer, or other means.

In one embodiment, a different associated value may be specified for each subsequent transaction. For instance, a customer may enter the value at an input field on a website, or the merchant may input the new value into the merchant terminal before or after inputting the card information.

In another embodiment, a different provider may also be specified (e.g., by the customer) for each transaction.

In step 1011, the central processor receives card information. Based on this information, the central processor may automatically "recharge" the card by causing the associated value into the customer's account.

This may occur in a manner similar to step 1003. The information may be received pursuant to a second request to activate the card or to otherwise process card information. The second request may be from a second merchant terminal, which may be associated with a different merchant. The second request may also be from the same merchant terminal. The request may also be from a any source that may communicate with the central processor, such as a computer, PDA, telephone or other device.

The central processor may then determine whether an account number and provider have been previously identified for the card associated with the received card information. For instance, the processor may access the card's record in the database and determine whether the entry includes an identified provider and account number. Because this account has already registered/activated above, and because the account and card information have already been stored, the central processor recognizes that this is an active card. For instance, the central processor may receive the barcode serial number or other identifier from the merchant terminal, and it may access the appropriate database entry and determine that the account is activated.

Here, the account is already associated with a provider and account number (and value, in a preferred embodiment) because the central processor has already identified and stored such information during a prior transaction. There is no need for the extra step of 1006, wherein the customer accesses the central system directly to make a redemption request. Thus, the central processor automatically inserts the value into the customer's account, as described above for step 1008.

In some embodiments, value identification information and account identification information may be passed to the central processor during the recharge request. The value insertion process may then continue as described elsewhere herein.

Step 1011 describes the process when a previously-processed card is used for a subsequent transaction. If a card has never been used for a transaction (and consequently the provider and account number have never been identified), the process would begin from step 1001. It should be noted that each time card information is transmitted from a merchant terminal (or other source) to the central processor, the processor may check to determine whether the card is already associated with an account number and provider. If it has been, the processor may automatically complete the transaction, such as by passing a request to add value to the provider or otherwise adding or inserting value into the customer's account.

In step 1012, the central processor optionally sends a confirmation to the merchant terminal, and the merchant terminal provides the confirmation to the customer.

Additional activation requests may be made for the card. For instance, after purchasing a card from a merchant terminal and activating the card, the customer may recharge the value of the card any number of times at any number of merchant terminals, including the same merchant terminal (s). The customer may also recharge the card via the internet or telephone. The customer may also specify various parameters during recharge, such as a new associated value, new provider, and new PIN (or other identifier).

It should be appreciated that the central processor may be a computer system of a provider, or it may be a separate system. For instance, the central processor may itself be a wireless carrier's computer system, wherein the carrier provides and redeems wireless PINs for customers. Alternately, it may be a system that is not directly affiliated with any wireless carrier, in which case it may merely serve as a centralized system.

The central processor may offer special deals and promotions to customers based on this information. For instance, the central processor may make offers or give awards or advantages to customers based on the number (or value, or total value) of cards or PINs they purchase and/or process.

It should be understood that a service provider may be any provider of any product and/or service. It should also be understood that the service may be any product or service.

It will be understood that the specific embodiments of the invention shown and described herein is exemplary only. Numerous variations, changes, substitutions and equivalents will now occur to those skilled in the art without departing from the spirit and scope of the present invention. Accordingly, it is intended that all subject matter described herein and shown in the accompanying drawings be regarded as illustrative only and not in a limiting sense and that the scope of the invention be solely determined by the appended claims.

What is claimed is:

1. A method of adding a value to a pre-existing customer account with a specific provider, the method utilizing an electronic central processor in selective communication with a computerized point of sale (POS) system and the provider, the method comprising:
    receiving, at the electronic central processor, from the computerized POS system a request to add a value to the pre-existing customer account, wherein the computerized POS system is associated with a retailer and wherein the information is received from a processor of the retailer, the request, comprising:
        value identification data associated with the value;
        account identification data associated with the pre-existing customer account;
    determining, by the electronic central processor, the specific provider based on the account identification data received from the computerized POS system; and
    providing, by the electronic central processor, to the processor of the specific provider, information that identifies the value and information that identifies the pre-existing customer account.

2. The method of claim 1, wherein the information that identifies the pre-existing customer account is the account identification data.

3. The method of claim 1, wherein the information that identifies the value is the value identification data.

4. The method of claim 1, wherein the information that identifies the value is an amount of the value.

5. The method of claim 1, wherein at least one of the value identification data and the account identification data is entered at the computerized POS system using a keycard.

6. The method of claim 1, wherein the pre-existing customer account is a telecommunications account.

7. The method of claim 1, wherein the account identification data is a phone number.

8. The method of claim 1, wherein the request further comprises an identifier that identifies the specific provider of the pre-existing customer account.

9. The method of claim 1, wherein the value is associated with a card, and wherein the value identification data comprises card identification information entered at the computerized POS terminal.

10. The method of claim 9, wherein the card identification information is entered at the POS system by reading a machine-readable indicia associated with the card identification information.

11. The method of claim 1, wherein the step of providing to the processor of the specific provider the information that identifies the value and the information that identifies the pre-existing customer account comprises sending to the specific provider a file conforming to an application programming interface (API) of the specific provider.

12. The method of claim 1, wherein the value is added to the pre-existing customer account by the specific provider.

13. The method of claim 1, wherein the POS system comprises one or more POS terminals.

14. The method of claim 1, wherein the pre-existing customer account is used for at least one of:
    wireless telephone service; paging service; internet-enabled communication service; wireless web access; emergency road service; transportation service; online dating service: internet access; film processing; gift cards(s); financial services, prepaid gas; prepaid grocery; prepaid entertainment; prepaid movie; downloadable ring tones; downloadable games; downloadable movie; downloadable music; customer rewards; bridge toll; road toll; long distance telephone communication; and wireless communication.

15. A system of adding a value to a pre-existing customer account with a specific provider, the system comprising:
    an input device in selective communication with at least one point of sale (POS) system associated with a retailer for receiving from the POS system a request to add the value to the pre-existing customer account, the request comprising value identification data associated with the value and account identification data associated with the pre-existing customer account received from a processor of the retailer;
    a processor fir determining the specific provider based at least in part on the account identification data; and
    an output device for communicating, by the central processor, with a processor of the specific provider and providing to specific provider information that identifies the value and information that identifies the pre-existing customer account.

16. The system of claim 15, wherein the information that identifies the pre-existing customer account is the account identification data.

17. The system of claim 15, wherein the information that identifies the value is the value identification data.

18. The system of claim 15, wherein the information that identifies the value is an amount of the value.

19. The system of claim 15, wherein the output device sends to the processor of the specific provider a file conforming to an application programming interface (API) of the specific provider.

20. The system of claim 15, wherein the POS system comprises one or more POS terminals.

21. The system of claim 15, wherein the pre-existing customer account is used for at least one of:
    wireless telephone service; telecommunication services; paging service; internet-enabled communication service; wireless web access; emergency road service; transportation service; online dating service; internet access; film processing; gift cards(s); financial services, prepaid gas; prepaid grocery; prepaid entertainment; prepaid movie; downloadable ring tones; downloadable games; downloadable movie; downloadable music; customer rewards; bridge toll; road toll; long distance telephone communication; and wireless communication.

* * * * *